United States Patent [19]

Kwak

[11] Patent Number: 5,332,151
[45] Date of Patent: Jul. 26, 1994

[54] COOLING/HEATING APPARATUS HAVING AUTOMATIC VENTILATING FUNCTION AND ITS CONTROL METHOD

[75] Inventor: Byung K. Kwak, Busan, Rep. of Korea

[73] Assignee: Gold Star Co., Ltd., Seoul, Rep. of Korea

[21] Appl. No.: 973,005

[22] Filed: Nov. 10, 1992

[30] Foreign Application Priority Data

Nov. 12, 1991 [KR] Rep. of Korea ............... 91/20036

[51] Int. Cl.⁵ .............................................. F24F 7/08
[52] U.S. Cl. ........................... 236/49.3; 236/78 D; 236/DIG. 9; 454/229; 454/256
[58] Field of Search .................. 236/49.3, 49.1, 49.2, 236/46 F, DIG. 9, 78 D; 165/16, 54; 454/229, 256, 258, 257, 909, 239, 343

[56] References Cited

U.S. PATENT DOCUMENTS 4,872,397  10/1989  Demeter et al. ............... 454/229
4,960,041  10/1990  Kiser ........................ 454/229 X
5,088,314  2/1992   Takashi ..................... 236/49.3 X

FOREIGN PATENT DOCUMENTS 198936  12/1982  Japan ....................... 454/256
64332   3/1990   Japan ....................... 165/54

Primary Examiner—Harry B. Tanner
Attorney, Agent, or Firm—Poms, Smith, Lande & Rose

[57] ABSTRACT

A cooling/heating apparatus having an automatic ventilating function and its method switches the ventilating function and the cooling/heating function in response to the pollution state of room air and maintains the room air in a pleasant state. The apparatus and method rotates the cooling/heating fan and the ventilating fan to be mutually supplemented and completed by the output of a gas sensor which changes its resistance value in response to the air pollution state within a room. The ventilating fan is rotated instead of said cooling/heating fan when the room air is polluted and ventilates the polluted air within a room.

18 Claims, 7 Drawing Sheets

COOLING/HEATING APPARATUS HAVING AUTOMATIC VENTILATING FUNCTION AND ITS CONTROL METHOD

FIELD OF THE INVENTION

The present invention relates to a cooling/heating apparatus having a ventilating function, and more particularly to a cooling/heating apparatus having automatic ventilating function and its control method capable of maintaining the air within a room in a pleasant state by driving via switching a ventilation fan and a cooling/heating fan in response to an air pollution state within a room during cooling/heating operation.

PRIOR ART

Recently, "high touch products" efficiently combined with functions of various electric home appliances each having different functions have been developed and have come into wide use. "High touch products" means products in which the respective intrinsic functions of different products or home appliances are effectively combined. For example, such a "high touch product" may be a VCR combined with a television. Among these high touch products, there are a cooling apparatus, a heating apparatus or a cooling/heating compatible apparatus having a ventilating function or air cleaning function as a product belonging to an air conditioner.

However, a conventional cooling/heating apparatus having said ventilating function is designed to execute the ventilating function and cooling/heating function so as to be mutually supplemented and completed in accordance with a selecting state of separate keys or switches for executing the ventilating function and the cooling/heating function. Accordingly, a user utilizing a cooling/heating apparatus having a ventilating function has to either open a window before carrying out the cooling/heating function or handle the keys or switched for carrying out the ventilating function in order to maintain the air within a room in a pleasant condition. And, when the cooling/heating function is carried out, the user has to sense every time an air pollution state exists within the room and handle the keys or switches provided on the cooling/heating apparatus in order to alternately carry out the ventilating function and the cooling/heating function in accordance wth the sensed result.

Thus, conventional cooling/heating apparatus having a ventilating function is made to manually switch the ventilating function and the cooling/heating function, it has a problem of imputting, and is inconvenient and cumbersome to the user.

And, since the above described cooling/heating apparatus switches the ventilating function and the cooling/heating function in accordance with the air pollution state within the room sensed by the user, there has been a problem in not maintaining the air within the room in a pleasant state and may injure the health of a user by carrying out the cooling/heating function in an impure indoor air condition.

SUMMARY OF THE INVENTION

Accordingly, it is an object of the present invention to provide a cooling/heating appratus having an automatic ventilating function and its control method capable of maintaining the air within a room in a pleasant state by driving a ventilating fan and a cooling/heating fan to be mutually supplemented and completed as explained hereinafter in response to the air pollution state within a room during the cooling/heating operation.

In order to accomplish the above-described object, the cooling/heating apparatus having an automatic ventilating function of the present invention comprises: a first motor for rotating a cooling or heating fan, a first motor driving means for driving the first motor, a second motor for rotating a ventilating fan, a second motor driving means for driving the second motor, a means for sensing the air pollution state within a room, and a control means for controlling the first motor driving means and the second motor driving means to be mutually supplemented and completed in response to the output of the pollution sensing means.

In order to achieve the above-described object, the cooling/heating control method having an automatic ventilating function of the present invention comprises: a process for inducing a cooling or heating operation demand, a process for cleaning polluted air within a room by driving the ventilating fan and setting a clearness standard value of the air within a room, a process for driving a cooling or heating fan instead of the ventilating fan and observing a cleanness of indoor air, and a process for driving the ventilating fan instead of the cooling or heating fan when the cleanness of the indoor air is different from the cleanness standard value.

Other objects and features than the above-described object may be clearly understood through detailed description of following embodiment with reference to the accompanying drawings.

DETAILED DESCRIPTION OF THE PREFERRED EMBODIMENTS

Figure 1:
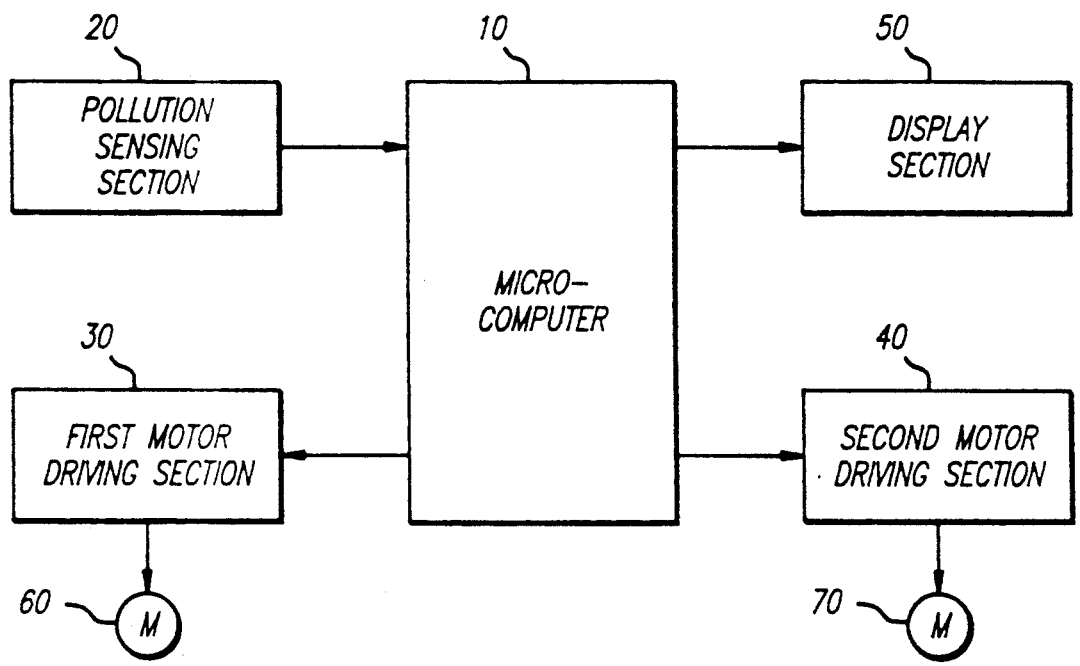
FIG. 1 is a block diagram of a cooling/heating apparatus having an automatic ventilating function in accordance with a preferred embodiment of the present invention.

Referring to FIG. 1, a cooling/heating apparatus having an automatic ventilating function comprising a pollution sensing section 20 for sensing the air pollution state within a room and a micro-computer 10 to be inputted with an air pollution sensing signal from the pollution sensing section 20. The micro-computer 10 feeds a first motor driving signal to a first motor driving section 30 for driving a cooling fan motor 60 in response to a level of the air pollution sensing signal or feeds a second motor driving signal to a second motor driving section 40 for driving a ventilating fan motor 70. And, the micro-computer 10 feeds a display control signal of pulse signal form having a logic value corresponding to the level of the air pollution sensing signal to a display section 50 for displaying air cleanness within a room. The first motor driving section 30 rotates the cooling-/heating fan motor 60 at a speed corresponding to a logic value of the first motor driving signal from the micro-computer 10. And, the second motor driving section 40 rotates the ventilating fan motor 70 at a speed corresponding to a logic level of the second motor driving signal fed from the micro-computer 10.

Figure 3:
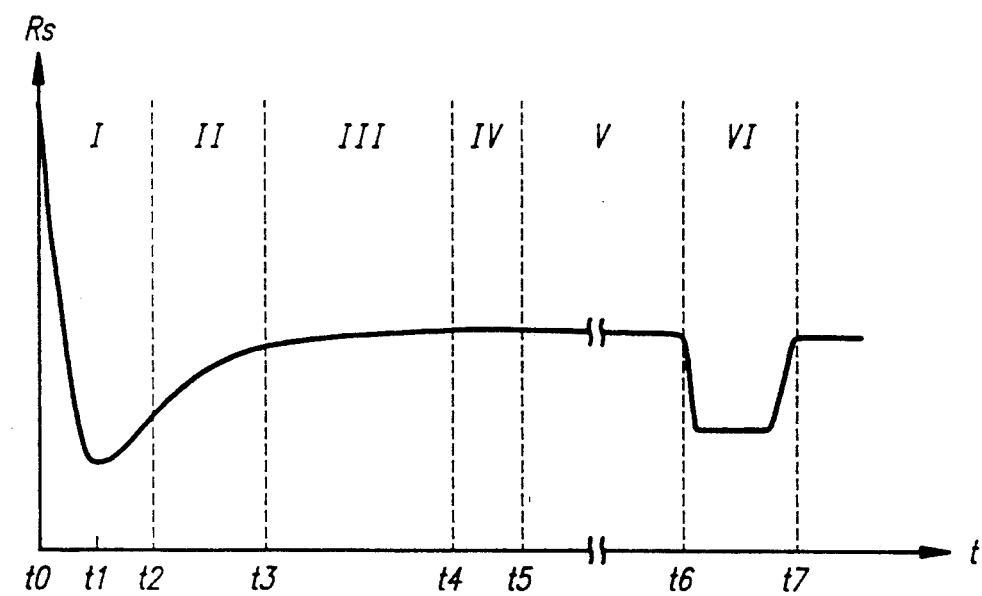
FIG. 3 is an output characteristic graph of a gas sensor shown in FIG. 2, FIG. 4A to FIG. 4J are wave form charts of output of each portion of the second motor driving section shown in FIG. 2, FIGS. 5 and 6 show a flow chart of the cooling/heating control method having an automatic ventilating function in accordance with a preferred embodiment of the present invention.
Figure 2:
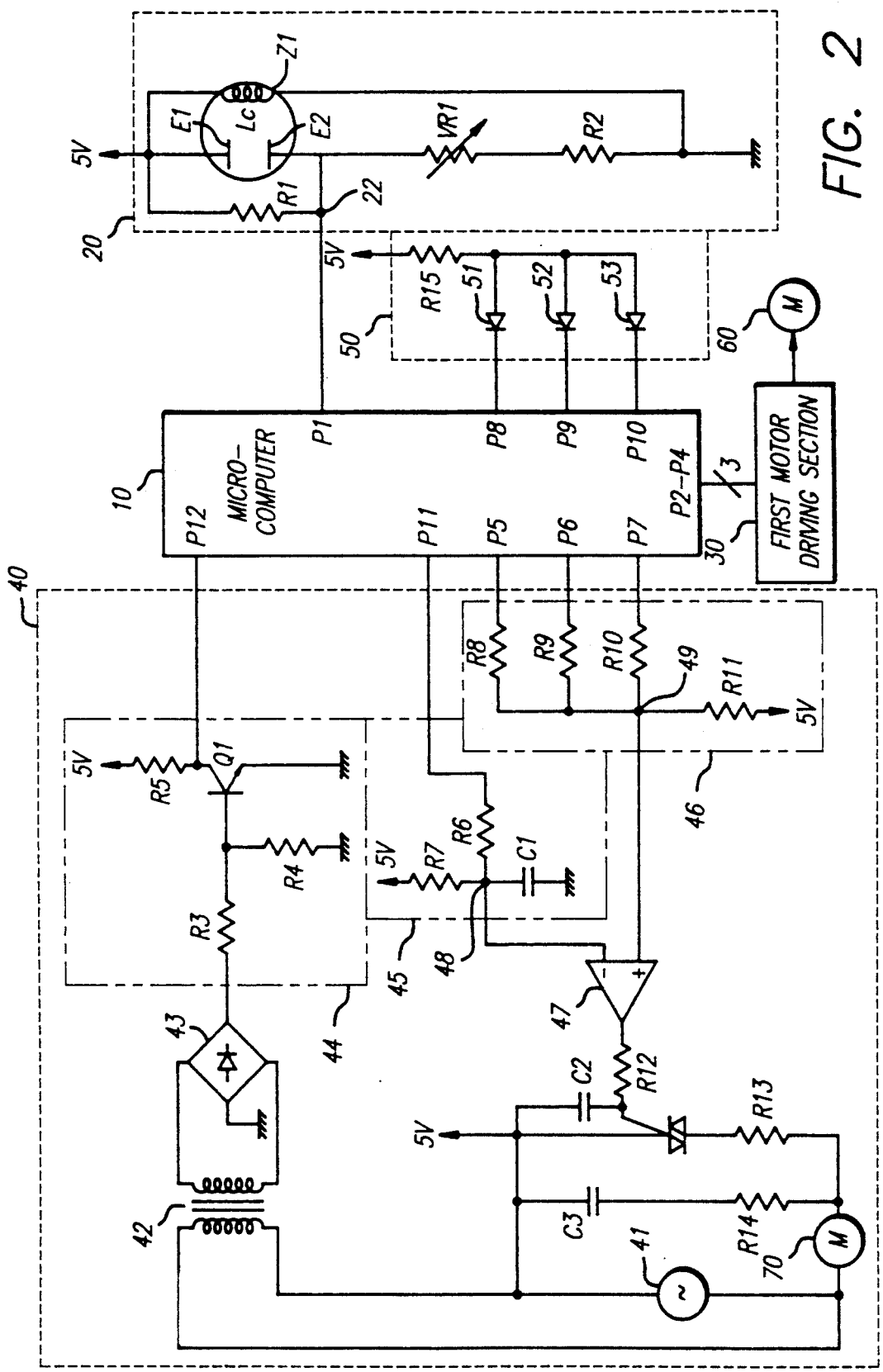
FIG. 2 is a detailed circuit diagram of the cooling/heating apparatus having an automatic ventilating function shown in FIG. 1.

Referring FIG. 2, a detailed circuit of the cooling-/heating apparatus having an automatic ventilating function shown in FIG. 1 is illustrated. In FIG. 2, the pollution sensing section 20 includes a gas sensor 21 having electrodes E1 and E2 and a heater Lc. One end of the terminals of the heater Lc and One electrode E1 are connected to a first direct current supplying power source 5 v, and another terminal of the heater Lc is connected to a second direct current supplying power source GND, and another electrode E2 is connected to the second direct current supplying power source GND through a variable resistor VR1 and a resistor R2. And, the pollution sensing section 20 additionally includes a resistor R1 connected with the electrodes E1 and E2 of the gas sensor 21. The gas sensor 21, as shown in FIG. 3, has a resistance value of a transient respondent characteristic in an initial operation (i.e.: in case where a direct current supplying power voltage 5 v is supplied) and thereafter has normal resistance value. In FIG. 3, a resistance value Rs of the gas sensor 21 would have an initial period transient responding state I in which a level swiftly drops down from a time $t_0$ when the direct current supply voltage 5 v starts to be applied to a time $t_1$ after approximately one second to five seconds whereby it reaches minimum level, and then the level swiftly rises up from a time $t_1$ being reached the minimum level to a time $t_2$ after approximately six seconds to thirty seconds. And, the resistance value Rs of the gas sensor 21 has an intermediate period transient responding state II in which the level slowly rises up from the time $t_2$ when the level is swiftly rised to a time $t_3$ after approximately thirty one seconds to sixty seconds, and a last period transient responding state in which the level slightly rises up from the time $t_3$ when the level is slowly rised to a time $t_4$ after approximately one to three minutes. And, the resistance value of the gas sensor 21 has a normal state V in which the level is not changed from the time $t_4$ when the level is slightly rised to a time $t_6$ when the air within a room starts to be polluted. Among the periods of normal state when the resistance value Rs of the gas sensor 21 has a predetermined level, a period from the time $t_4$ when the level of the resistance value Rs is slightly rised to a time $t_5$ after a predetermined time, is a section IV for setting a normal resistance value of the gas sensor 21 to an air cleaning standard value. Further, a period from the time $t_6$ when the resistance value Rs of the gas sensor 21 starts to be swiftly diminished from the air cleaning standard value to a time $t_7$ being restored again to the air cleaning standard value is a polluted section VI that the air within the room is polluted. The transient responding characteristic in the resistance value Rs of the gas sensor 21 results from the element characteristic of the gas sensor 21. A voltage level of the air pollution sensing signal produced transient responding characteristic at a connecting node 22 is changed in response to the change of the resistance value Rs of the gas sensor 21 (i.e., the air pollution state). That is, the air pollution sensing signal has a voltage level which is diminished as much as the resistance value increment when the resistance value of the gas sensor 21 is increased; and on the contrary; it has a voltage level which is increased as much as the resistance value decrement when the resistance value of the gas sensor 21 is diminished.

And, the micro-computer 10 is inputted with the air pollution sensing signal from the connecting node 22, and converts the inputted air pollution sensing signal into a digital signal. And, the micro-computer 10 judges a present indoor air pollution state by a logic value of the digital air pollution sensed signal, and in accordance with the judged result, determines the logic values of a first motor driving signal to be outputted through the first to third output terminals P2~P4, the logic values of the second motor driving signal to be outputted through the fourth to sixth output terminals P5~P7, and the logic values of display control signal to be outputted through the seventh~ninth output terminals P8~P10.

The first motor driving section 30 for inducing a first motor driving signal of 3 bits from the first to third output terminals P2~P4 of the micro-computer 10 stops the cooling/heating fan motor 60 when a logic signal of high logic state is produced to the first to third output terminals P2~P4 of the micro-computer 10, that is, when the logic value of the first motor driving signal is "111". And, when a logic signal of low logic state is produced to any one output terminal of the first to third output terminals P2~P4 of the micro-computer 10, that is, when the logic value of the first motor driving signal is "011", "101" or "110", it rotates the cooling/heating fan motor 60 at high speed, intermediate speed or low speed in accordance with the output terminal of the micro-computer 10 generated with a logic signal of low logic state.

Figure 4A:
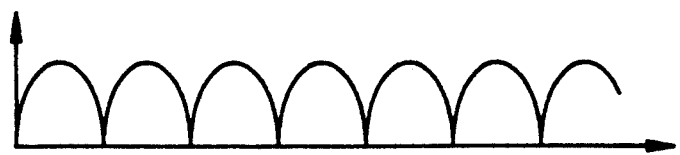
Figure 4B:
Figure 4C:
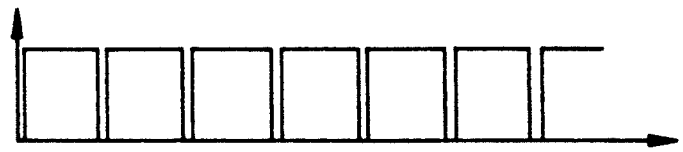
Figure 4D:
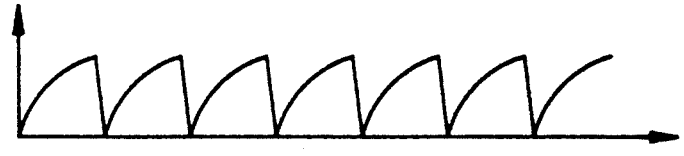
Figure 4E:
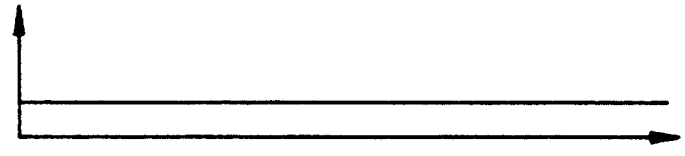
Figure 4F:
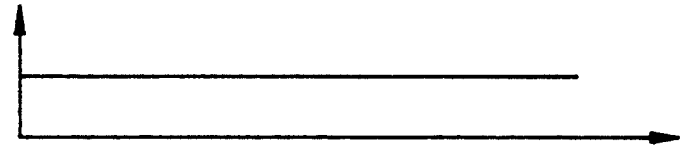

And, the second motor driving section 40 includes a transformer 42 for inducing an alternating current from the alternating current power source 41. The transformer 42 drops the alternating current voltage to about 5 v and supplies the dropped alternating current voltage to a bridge rectifier 43. The bridge rectifier 43 full wave rectifies the dropped alternating current voltage from the transformer 42 and supplies the full wave rectified sine wave signal to a base of a transistor Q1 through a resistor voltage divider R3,R4 as FIG. 4A. The transistor Q1 forming a wave form converter together with the resistor voltage divider R3,R4 and a resistor R5 is turned on only when a voltage of the full wave rectified sine wave signal being voltage divided by the resistor voltage divider R3,R4 is bigger than an operating voltage and generates a pulse signal of high logic state of 120 Hz being narrow in width as FIG. 4B. The pulse signal of high logic state of the 120 Hz is fed to an interrupt terminal P12 of the micro-computer 10. The micro-computer 10 inverts the pulse signal of high logic state of 120 Hz fed to the interrupt terminal P12 as FIG. 4C and then feeds the inverted pulse signal to a connecting node 48 through a tenth output terminal P11 and a resistor R6. A capacitor C1 connected between the connecting node 48 and the second direct current supply power source GND forms an integral circuit 45 together with a resistor R7 connected between the connecting node 48 and the first direct current supply power source 5 v and the resistor R6, and integrates the buffered pulse signal from the micro-computer 10 whereby generates a saw tooth wave signal as FIG. 4D to the connecting node 48. On the other hand, four resistors R8~R11 in which one of their end terminals are connected to the connecting node 49 and their other terminals are respectively connected to the fourth to sixth output terminals P5~P7 and the first direct current supply power source 5 v of the micro-computer 10, forms one of ladder type digital-analog converter 46. The digital-analog converter 46 converts the second motor driving signal of digital signal form from the fourth to sixth output terminals P5~P7 of the micro-computer 10. The resistance value of three resistors R8~R10 connected respectively to the fourth to sixth output terminals P5~P7 of the micro-computer 10 are set so as to be R8<R9<R10. The digital-analog converter 46 generates an analog signal as FIG. 4E having a voltage level of 5R8/R8+R11 to the connecting node 48 where a logic signal of low logic state is generated only to the fourth output terminal P5 of the micro-computer 10 (i.e., when the logic value of the second motor driving signal is "011"). And, the digital-analog converter 46 generates an analog signal as FIG. 4F having a voltage level of 5R9/R9+R11 where a logic signal of low logic state is generated only to the fifth output terminal P6 of the micro-computer 10 to the connecting node 48 (i.e., when the logic value of the second motor driving signal is "101"). And, where a logic signal of low logic state is generated only to the sixth output terminal P7 of the micro-computer 10 (i.e., in case where the logic value of the second motor driving signal is "001"), the digital-analog converter 46 generates an analog signal having a voltage level of 5R10/R10+R11. Finally, the digital-analog converter 46 generates an analog signal having a voltage level of 5 v where logic signals of high logic state are generated to all of the fourth to sixth output terminals P5~P7 of the micro-computer 10 (i.e., in case where the logic value of the second motor driving signal is "111"). Then, a comparator 47 compares the saw tooth wave signal produced at the connecting node 48 and the analog signal generated at the connecting node 49 and thereby generates a high logic signal when the voltage of the analog signal is bigger than the voltage of the saw tooth wave signal. In other words, the comparator 47 generates a switching control signal as FIG. 4G where the analog signal as FIG. 4E is inputted, and generates the switching control signal as FIG. 4H when the analog signal as FIG. 4F is inputted. And, the comparator 47 generates a switching control signal for continuously maintaining the voltage of 5 v when an analog signal of 5 v is inputted.

Figure 4G:
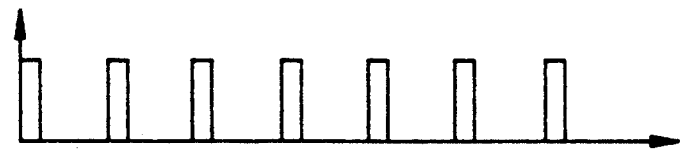
Figure 4H:
Figure 4I:
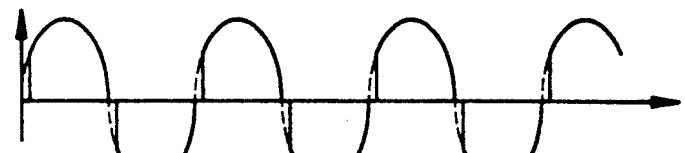
Figure 4J:

A triac Ta phase controls the alternating current voltage supplied to the ventilating fan motor 70 through its own anode, cathode and resistor R13 from the alternating current power source 41 by being converted in accordance with the logic state of the switching control signal applied to its own gate through a resistor R12 from the comparator 47. Explaining this in more detail, the triac Ta makes the alternating current voltage as FIG. 4I to be supplied to the ventilating fan motor 70 when the switching control signal as FIG. 4G is inputted from the comparator 47, and makes the alternating current voltage as FIG. 4J to be supplied to the ventilating fan motor 70 when the switching control signal as FIG. 4H is inputted and thereby accelerates and decelerates the rotational speed of the ventilating fan motor 70. And, the triac Ta completely cuts off the alternating current voltage supplied to the ventilating fan motor 70 when the switching control signal for maintaining 5 v from the comparator 47 and then stops the ventilating fan motor 70. A capacitor C3 and a resistor R14 connected in series between an anode and a cathode of the triac Ta and a capacitor C2 connected between the anode and a gate of the triac Ta protect the triac Ta and eliminate noise in the switching operation of the triac Ta.

Finally, the display section 50 comprises red, green and blue light emitting elements 51, 52, 53 respectively connecting their own cathodes to the seventh to ninth output terminals P8~P10 of the micro-computer 10 and a resistor R15 connecting one end terminal commonly to the anodes of the light emitting elements 51~53. The light emitting elements 51~53 are lighted on and off by pulse signals fed from the seventh to ninth output terminals P8~P10 of the micro-computer 10 to each cathode. In other word, the red light emitting element 51 is lighted on and off when the pulse signal is generated to the seventh output terminal P8 of the micro-computer 10 (i.e., when the logic value of display control signal is "011"), the green light element 52 is lighted on and off when the pulse signal is generated to the eighth output terminal P9 of the micro-computer 10 (i.e., when the logic value of display control signal is "010"), and the blue emitting element 53 is lighted on and off when the pulse signal is generated to the ninth output terminal P10 of the micro-computer 10. Light emitting diode LED is utilized as the red, green and blue emitting elements 51~53.

Figure 5A:
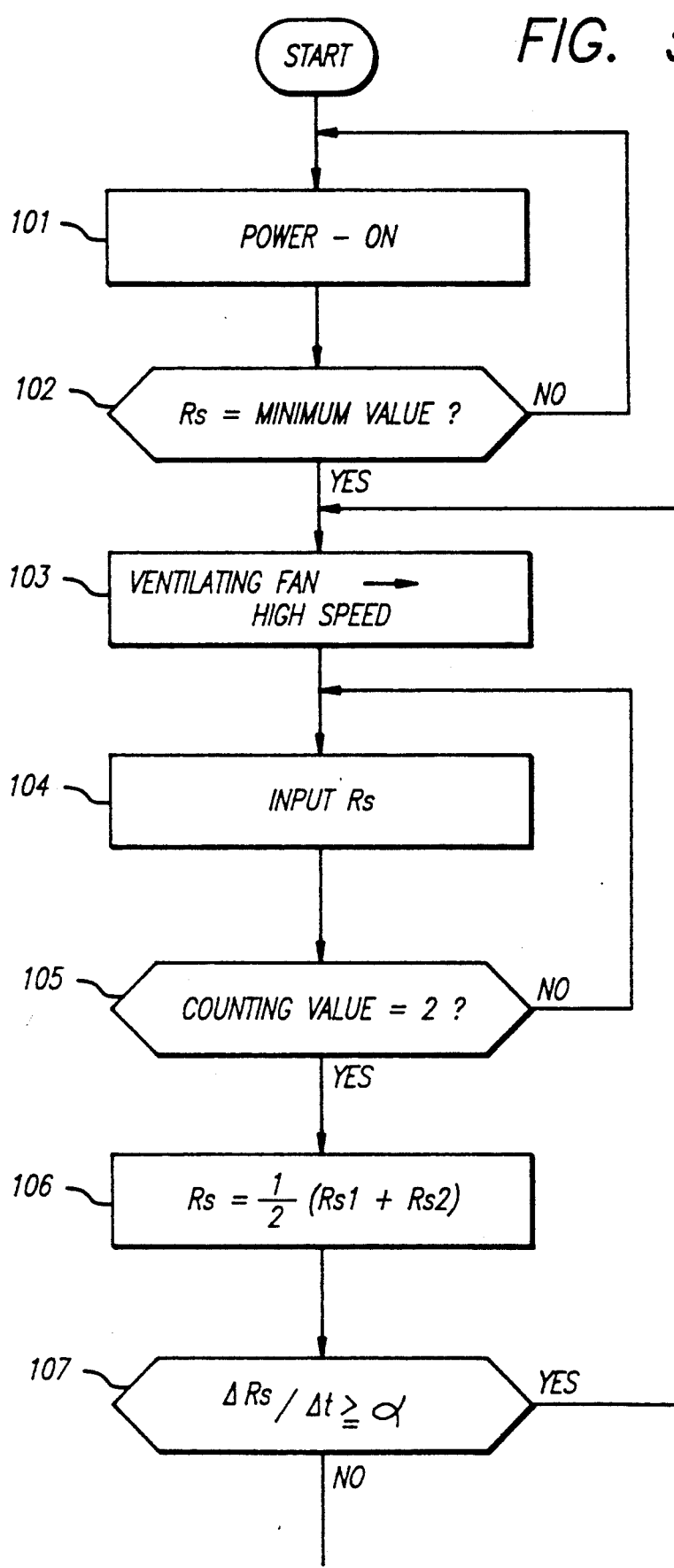
Figure 5B:
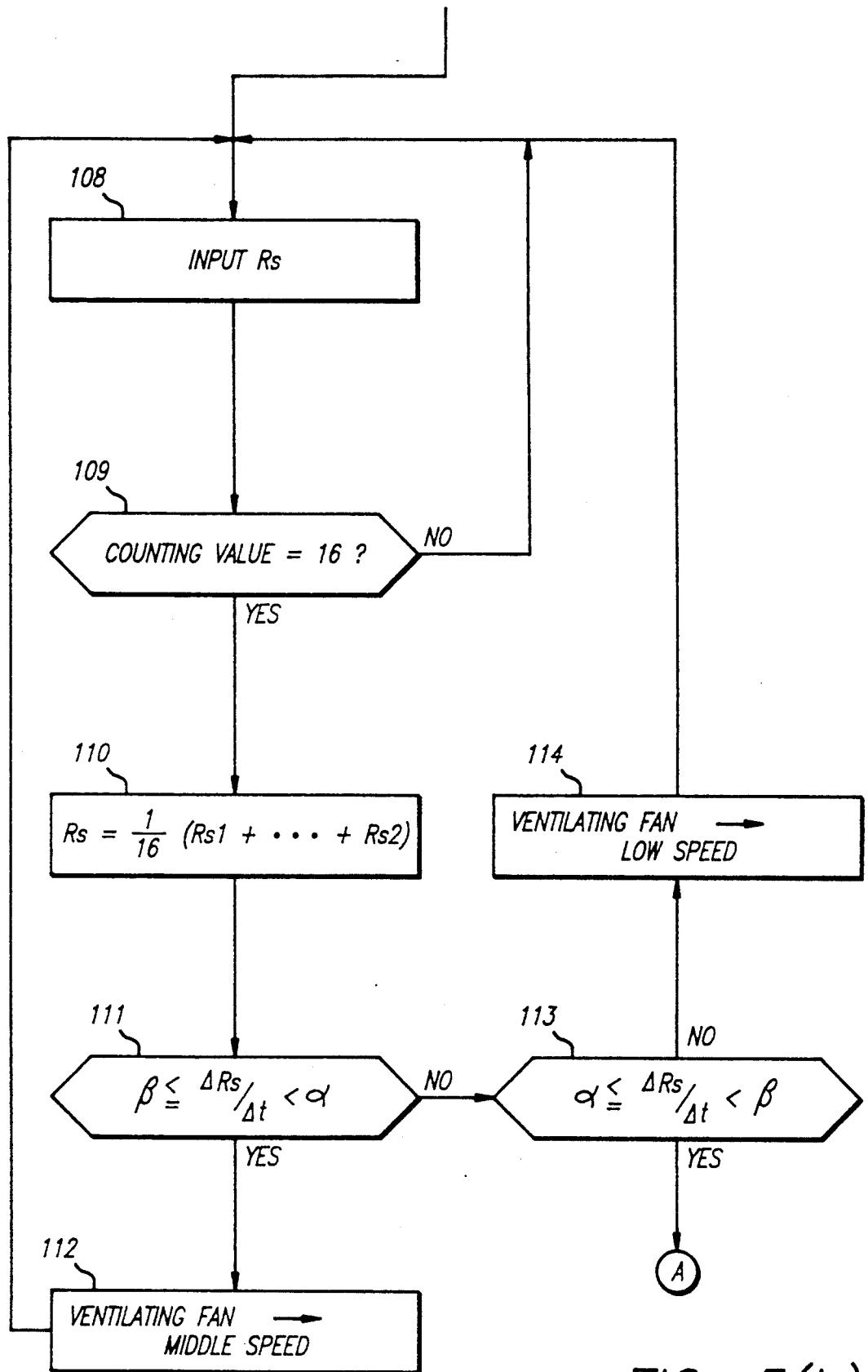

Referring to FIG. 5, a flow chart of the cooling/heating control method having an automatic ventilating function in accordance with a preferred embodiment of the present invention carried out in the cooling/heating apparatus having an automatic ventilating function shown in FIG. 1 and FIG. 2 is illustrated.

At step 101, the micro-computer 10 supplies the power to the pollution sensing section 20, the first and second motor driving sections 30, 40 and the display section 50 when a power key (not shown) is inputted by a user.

After step 101, the micro-computer 10 monitors a swiftly dropping resistance value Rs of the gas sensor 21 and detects minimum resistance value of the gas sensor 21 and then stores the detected minimum resistance value of the gas sensor 21 to a memory within itself (step 102).

After detecting the minimum resistance value of the gas sensor 21 at the step 102, the micro-computer 10 feeds the second motor driving signal having a logic value of "011" (i.e., in case where the logic signal generated to the fourth output terminal of the micro-computer 10 is low logic state) to a D-A converter 46 of the second motor driving section 40 and thereby makes the motor driving section 40 rotate the ventilating fan motor 70 at high speed. And, the micro-computer 10 applies a display control signal having a logic value of "011" through the seventh to ninth output terminals P8~P10 (i.e., applies the pulse signal through the seventh output terminal P8 to the red light emitting element 51), and lights on and off the red light emitting element 51 so as to display that the polluted air within the room is being cleaned at high speed. At this moment, the D-A converter 46 generates a direct current voltage as FIG. 4E corresponding to a logic value of "011" of the second motor driving signal, the comparator 47 generates a switching control signal as FIG. 4G, and the triac Ta supplies a direct current voltage as FIG. 4I to the ventilating fan motor 70 (step 103).

After executing the step 103, the micro-computer 10 executes from step 104 to step 106 in order to detect the resistance value of the gas sensor 21 for one second. At step 104, the micro-computer 10 is inputted with the resistance value Rs of the gas sensor 21 after 500 ms and stores to a RAM within oneself and thereafter counts a resistance value inputting number of times allocated to a register of oneself by adding 1. And, the micro-computer 10 checks whether or not the resistance value inputting number of times is 2, and in case where the resistance value inputting number of times is less than 2, returns to step 104 (step 105).

Where the resistance value inputting number of times is 2 at step 105, the micro-computer 10 averages the inputted two resistance values $R_s$ of the gas sensor 21 and calculates an average resistance value Rsn for one second (step 106).

After executing step 106, the micro-computer 10 subtracts an average resistance value $R_{sn-1}$ of the gas sensor 21 calculated before one second from an average resistance value $R_{sn}$ of the gas sensor 21 calculated at step 106 and then calculates a resistance changed amount $\Delta R_s/\Delta t_1$ for one second, and compares the calculated resistance changed amount $\Delta R_s/\Delta t$ with a first standard value $\alpha$ (step 107). Where the calculated resistance changed amount $\Delta R_s/\Delta t$ for one second is bigger than the first standard value $\alpha$, the micro-computer 10 executes again step 103. As a result, the micro-computer 10 executes step 103~step 107 and thereby serves the function of cleaning the polluted air within the room in a short time period (i.e., within an initial period transient responding section I of $t_1 \sim t_2$ shown in FIG. 3).

At step 107, where the resistance changed amount $\Delta R_s/\Delta t$ for one second is less than the first standard value $\alpha$, that is, when the air within the room is swiftly cleaned whereby the resistance value $R_s$ of the gas sensor 21 is slowly increased, the micro-computer 10 executes from step 108 to step 112 and thereby ventilates the polluted air within the room at a middle speed. At step 108, the micro-computer 10 inputs the resistance value $R_s$ of the gas sensor 21 after a time of 500 ms is elapsed and stores to the RAM of oneself and adds the resistance value inputting number of times by 1. And, the micro-computer 10 checks whether or not the resistance value inputting number of times is 16, and in case where the resistance value inputting number of times is not 16, executes again step 108 (step 109). On the contrary, where the resistance value inputting number of times is 16, that is, after eight seconds elapse, the micro-computer 10 integrates the resistance values $R_s$ of the gas sensor 21 of sixteen times amount and thereby calculates an average resistance value (step 110). After executing step 110, the micro-computer 10 subtracts the prior average resistance value from the average resistance value and calculates the resistance change per second $\Delta R_s/\Delta t$ of the gas sensor 21, and compares the calculated resistance change per second $\Delta R_s/\Delta t$ with the first standard value $\alpha$ and second standard value $\beta$ stored to the ROM within oneself (step 111). Where the resistance change per second $\Delta R_s/\Delta t$ of the gas sensor 21 is bigger than the second standard value $\beta$ or the same and smaller than the first standard value $\alpha$, the micro-computer 10 feeds the logic signal of low logic state (i.e., the second motor driving signal having a logic value of "101") to the D-A converter 46 of the second motor driving section 40 through the fifth output terminal P6 and thereby rotates the ventilating fan motor 70 at a middle speed. And the micro-computer 10 feeds the pulse signal to the cathode of the green light emitting element 52 through the eighth output terminal P9 whereby lights on and off the green light emitting element 52 so as to display that the polluted air within the room is being ventilated presently at a middle speed. At this moment, the D-A converter 46 of the second motor driving section 40 generates a direct current voltage as FIG. 4F, the comparator 47 generates a switching control signal as FIG. 4H, and the triac Ta supplies an alternating current voltage as FIG. 4J to the ventilating fan motor 70 (step 112). And, the micro-computer 10 executes again step 108 after executing step 112.

At step 111, where the resistance change $\Delta R_s/\Delta t$ of the gas sensor 21 is smaller than the second standard value $\beta$, the micro-computer 10 compares whether or not the resistance change $\Delta R_s/\Delta t$ of the gas sensor 21 is bigger than the third standard value $\gamma$ stored to the ROM within oneself or same (step 113). At step 113, where the resistance change per second $\Delta R_s/\Delta t$ of the gas sensor 21 is bigger than the third standard value $\gamma$ or the same, the micro-computer 10 feeds a logic signal of low logic state, that is, the second motor control signal having a logic value of "110" to the second motor driving section 40 through the sixth output terminal P7 and thereby makes the second motor driving section 40 to rotate the ventilating fan motor 70 at a low speed. And, the micro-computer 10 feeds a pulse signal to a cathode of the blue light emitting element 53 through the ninth output terminal P10 whereby lights on and off the blue light emitting element 53 so as to display that the polluted air within the room is being ventilated at low speed (step 114). After executing step 114, the micro-computer 10 executes step 108. As a result, the micro-computer 10 executes step 113, step 114 and step 108 ~ step 110, and ventilates the polluted air within the room until a time when the air within the room is in a clean state, that is, when the resistance change $\Delta R_s/\Delta t$ of the gas sensor 21 approaches almost to "0". Furthermore, at steps 101~114, the micro-computer initialized air within the room, allowing the standard air cleanness value to be set in the clean air condition.

Figure 6:
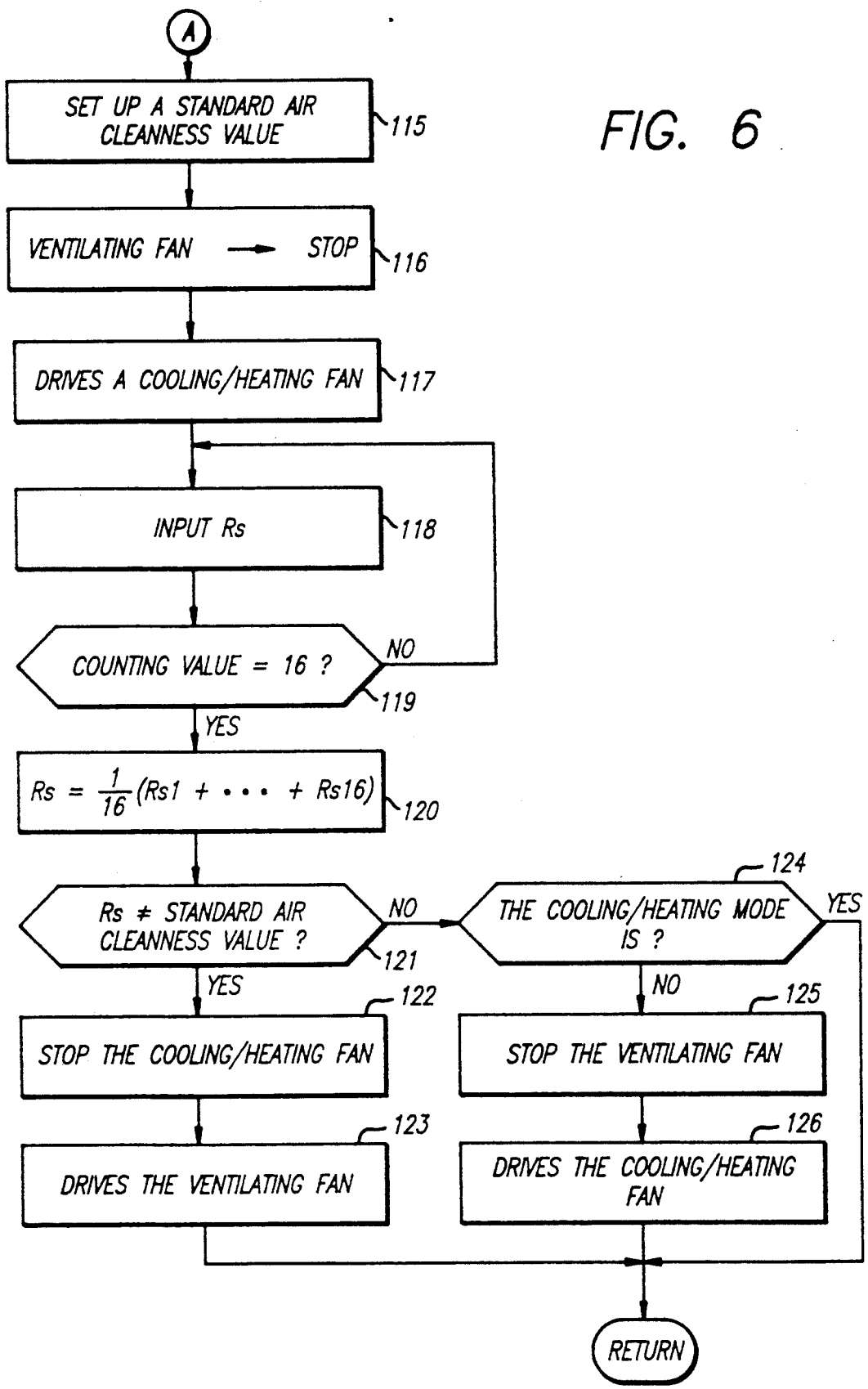

Referring to FIG. 6, at step 113, where the resistance change per second $\Delta R_s/\Delta t$ of the gas sensor 21 is smaller than the third standard value $\gamma$, the micro-computer 10 stores an average resistance value of the gas sensor 21 calculated at step 110 to the memory within oneself as a standard air cleanness value instead of minimum resistance value of the gas sensor sensed at step 102 and thereby sets the cleanness standard value (step 115).

After executing step 115, the micro-computer 10 feeds a logic signal of high logic state, that is, the second motor driving signal of logic value of "111" to the second motor driving section 40 through the fourth~sixth output terminals P5~P7, and makes the second motor driving section 40 to stop the ventilating fan motor 70. And, the micro-computer 10 applies a logic signal of high logic state to the cathodes of red, green and blue light emitting elements 51~53 through the seventh~ninth output terminals P8~P10 and thereby lights off all of the three light emitting elements (step 116).

After executing step 116, the micro-computer 10 sets a cooling/heating mode flag to 1 instead of a ventilating mode flag set at step 101 whereby sets the cooling/heating mode. And, the micro-computer 10 feeds a logic signal of low logic state, that is, the first motor driving signal having a logic value of "011", "101" or "110" to the first motor driving section 30 through any one output terminal among the first~third output terminals P2~P4, and makes the first motor driving section 30 to rotate the cooling/heating fan motor 60 at a high, middle or low speed (step 117).

After executing step 117, the micro-computer 10 executes step 118~step 121 whereby senses a polluted condition of the air within the room. Explaining this, at step 118, the micro-computer 10 waits for a time period of 500 ms and thereafter inputs the resistance value $R_s$ of the gas sensor 21 and stores to the RAM of oneself and then adds the resistance value inputting number of times by 1. And, the micro-computer 10 checks whether or not the resistance value inputting number of times is 16, and in case where the resistance value inputting number of times is smaller than 16, executes again step 118 (step 119). On the other hand, where the resistance value inputting number of times is 16, the micro-computer 10 calculates an average resistance value of the 16 resistance values RS1, RS2, ..., RS16 of the gas sensor 21 stored to the RAM within oneself (step 120). After executing step 120, the micro-computer 10 compares the air cleanness standard value set at step 115 and the average resistance value calculated at step 120, and senses whether or not the air within the room is polluted (step 121). At this moment, the micro-computer 10 judges that the air within the room is polluted where the average resistance value is smaller than the air cleanness standard value (i.e., at a time $t_6$ of FIG. 3).

At step 121, when the average resistance value $R_s$ is smaller than the air cleanness standard value, the micro-computer 10 feeds a logic signal of high logic state, that is, the first motor driving signal of logic value of "111" to the first motor driving section 30 through the first~third output terminals P2~P4, and makes the first motor driving section 30 to stop the cooling/heating fan motor 60 (step 122). After executing the step 122, the micro-computer 10 sets a ventilating mode flag to 1 instead of the cooling/heating mode flag set at step 117 whereby sets the ventilating mode. And, the micro-computer 10 feeds the second motor driving signal having a logic value of 011, 101 or 110 in accordance with the difference in quantity of the average resistance value $R_s$ of the gas sensor 21 calculated at step 120 and the cleanness standard value to the second motor driving section 40 through the fourth~sixth output terminals P5~P7, and thereby makes the second motor driving section 40 to rotate the ventilating fan motor 70 at high speed, middle speed or low speed so as to ventilate the polluted air within the room at high speed, middle speed or low speed. And, the micro-computer 10 feeds a display control signal of pulse form having a logic value of 011, 101 or 110 in accordance with the difference in quantity of an average resistance value of the gas sensor 21 and the air cleanness standard value to the red, green and blue light emitting elements 51~53 and thereby lights on and off the red, green or blue light emitting elements 51~53 so as to display that the presently polluted air within the room is being ventilated at high speed, middle speed or low speed (step 123).

On the other hand, in case where the air cleanness standard value is the same as the average resistance value of the gas sensor 21, the micro-computer 10 checks whether or not the cooling/heating mode flag is set to 1 and judges whether or not presently it is in a cooling/heating mode (step 124). At step 124, where the cooling/heating mode flag is reset, the micro-computer 10 feeds a logic value of 111 to the second motor driving section 40 through the fourth~sixth output terminals P5~P7 and makes the second motor driving section 40 stop the ventilating fan motor 70, and feeds a display control signal having a logic value of 111 to the red, green and blue light emitting elements 51~53 through the seventh~ninth output terminals P7~P9 whereby lights off all three light emitting elements 51~53 (step 125). After executing step 125, the micro-computer 10 sets the cooling/heating mode flag to 1 instead of the ventilating mode flag set at step 123 whereby sets the cooling/heating mode. And, the micro-computer 10 feeds a logic signal of low logic state, that is, the first motor driving signal having a value of "011", "101" or "110" to the first motor driving section 30 through any output terminal among the first~third output terminals P2~P4, and makes the first motor driving section 30 rotate the cooling/heating fan motor 60 at high speed, middle speed or low speed (step 126).

Explaining the flow chart shown in FIGS. 5 and 6 by joining with the resistance characteristic graph shown in FIG. 3, in the initial period transient respondent region I, the micro-computer 10 executes step 101~step 107 whereby rotates the ventilating fan motor 70 at high speed. And, the micro-computer 10 executes step 108~step 112 in the intermediate period transient respondent region II whereby rotates the ventilating fan motor 70 at middle speed. And, the micro-computer 10 executes step 108~step 110, step 113 and step 114 in the last period transient respondent region III whereby rotates the ventilating fan motor 70 at low speed. Further, the micro-computer 10 executes step 115 in the air cleanness standard value setting region IV whereby sets the air cleanness standard value.

And, the micro-computer 10 executes step 116~step 121 in the normal respondent region V whereby drives the cooling/heating fan motor 60 instead of the ventilating fan motor 70 and senses the air pollution level within the room.

Finally, in the abnormal region, the micro-computer 10 executes step 122~step 126 during the time period from when the polluted air within the room is sensed until it is cleaned, and thereby rotates the ventilating fan motor 70 instead of the cooling/heating fan motor 60 in response to the pollution level within the room at high speed, middle speed or low speed.

Figure 7:
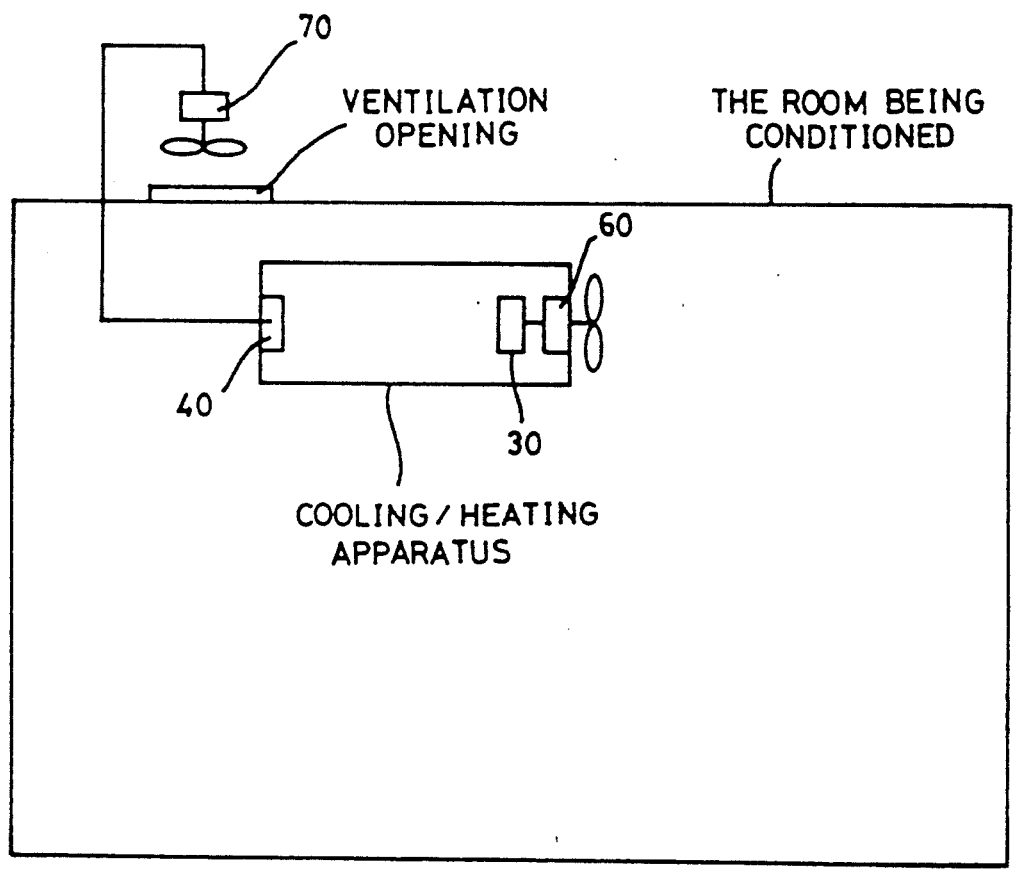
FIG. 7 is a schematic representation showing the locations of a cooling/heating fan motor and a ventilating fan motor, and their associated fans, with respect to a room being conditioned.

FIG. 7 is a schematic representation showing the locations of the cooling/heating fan motor 60 and the ventilating fan motor 70, and their associated fans, with respect to a room being conditioned.

As described above, the present invention has the advantage of sensing a polluted condition of air within a room by utilizing a gas sensor and drives by switching the ventilating fan and the cooling/heating fan in accordance with the sensed result and which is capable of maintaining the air within the room at a pleasant condition, and it has advantage of providing a convenience to a user.

And the present invention has the advantage of preventing extravagance in electric power use by controlling the speed of the ventilating fan motor in response to the pollution level of the air within the room.

Mutually supplemental and completed," as used herein, means that, if either the cooling/heating fan motor 60 (or its fan) or the ventilating fan motor 70 (or its fan) is driven or operated, then the other motor (or its fan) is not driven or operated, and the speed of the ventilating fan motor 70 (or its fan) is controlled depending upon the air pollution state within a room.

In the detailed description of the above-described embodiment, a fan is used as a means for ventilating the air but a dust collecting filter can be utilized instead of the fan, and it is explained by limiting it to a cooling-/heating compatible apparatus having an air cleaning function for an embodiment, but it can be understood by a person with ordinary knowledge that it can be applied to the cooling apparatus and the heating apparatus having an air cleaning function of the present invention.

What is claimed is:

1. In a cooling/heating apparatus having an automatic ventilating function; an apparatus comprising:
    a first motor for rotating a cooling/heating fan;
    a first motor driving means for driving said first motor;
    a second motor for rotating a ventilating fan;
    a second motor driving means for driving said second motor;
    a means for sensing an air pollution state within a room; and
    a control means (a) for alternately and selectively controlling said first motor driving means and said second motor driving means in response to the output of said pollution sensing means, and (b) for controlling a speed of rotation of said ventilating fan in response to the output of said pollution sensing means, said control means comprising a microcomputer.

2. An apparatus as defined in claim 1, wherein said second motor driving means comprises:
    an alternating current power source for supplying an alternating current voltage for operation to said second motor;
    a control switch element for switching an alternating current voltage to be supplied to said second motor from said alternating current power source; and
    a switching control means for feeding a switching control signal having a pulse width corresponding to a logic value of the second motor driving signal from said control section to said control switch element.

3. An apparatus as defined in claim 2, wherein said switching control means comprises: a means for full wave rectifying the alternating current voltage from said alternating current power source, a means for converting the output of said full wave rectifying means to a saw tooth wave signal, and a comparing means for comparing the motor driving signal from said control section and the saw tooth wave signal from said wave form converting means and applying its compared result to said controlling switch element.

4. An apparatus as defined in claim 3, wherein
    said switching control means additionally comprises digital-analog converting means by converting the second motor driving signal from said micro-computer into an analog signal and feeding to said comparing means.

5. An apparatus as defined in claim 4, wherein said control switch element is made of triac.

6. An apparatus as defined in claim 1, wherein said pollution sensing means comprises a gas sensor being changeable in its resistance in response to the pollution state of the air.

7. In a control method for controlling an apparatus of claim 6; a method comprising:
    a process for sensing an air pollution state within the room by a resistance value of said gas sensor and driving said second motor so as to ventilate a room air in response to the sensed result and setting a cleanness standard value of the room air;
    a process for driving said first motor so as to increase or decrease a room temperature instead of driving said second motor and comparing the resistance value of said gas sensor with said air cleanness standard value and observing the air pollution state within the room; and
    a process for ventilating the room air by driving said second motor instead of driving said first motor when the resistance value of said gas sensor and said air cleanness standard value do not agree.

8. A method as defined in claim 7, wherein said air cleanness standard value setting process comprises:
    a step for detecting minimum resistance value of said gas sensor,
    a step for driving said second motor so as to ventilate the room air in high speed until the resistance changing amount of said gas sensor becomes a first standard value,
    a step for driving the second motor so as to ventilate the room air at middle speed until the resistance change of said gas sensor falls below a second standard value,
    a step for driving the second motor so as to ventilate the room air at low speed until the resistance change of said gas sensor falls below a third standard value, and
    a process for setting the resistance value of said gas sensor to said air cleanness standard value when the resistance change of said gas sensor falls below the third standard value.

9. A method as defined in claim 8, wherein said resistance change of the gas sensor is a resistance change for one second.

10. A method as defined in claim 9, wherein said resistance change of the gas sensor at the high speed ventilating step is calculated based on said resistance value of the gas sensor of one second duration sensed at every 500 ms time.

11. A method as defined in claim 10, wherein said resistance change of the gas sensor at said middle speed and low speed ventilating steps is calculated based on said average resistance value for eight seconds of the gas sensed at every 500 ms.

12. A method as defined in claim 7, wherein said observing process of the room air pollution comprises: a step for calculating an average value of said resistance values of eight seconds amount of the gas sensor sensed with said resistance value of the gas sensor at every 500 ms; and a step for comparing said average resistance value of the gas sensor with said air cleanness standard value.

13. A method as defined in claim 12, wherein said motor switching process is for driving the second motor at high speed, middle speed and low speed in response to the difference in quantity of said air cleanness standard value and said average resistance value of the gas sensor.

14. A cooling/heating control method having an automatic ventilating function comprising:
    a process for inducing a cooling/heating operation demand;
    a process for sensing an air pollution state within a room by a gas sensor and rotating a ventilating fan so as to ventilate polluted air within the room in accordance with a sensed result and setting the cleanness standard value of an air within the room;

a process for driving a cooling/heating fan so as to increase and decrease a temperature within the room instead of driving said ventilating fan and comparing the cleanness standard value with a state value of the air within the room sensed by said gas sensor at a predetermined period; and a process for driving the ventilating fan instead of driving said cooling/heating fan and ventilating the polluted air within the room when the resistance value of said gas sensor and said air cleanness standard value do not agree.

15. A method as defined in claim 14, wherein said process for setting the air cleanness standard value comprises:

a step for detecting a maximum air pollution value by said gas sensor;

a step for driving said ventilating fan so as to ventilate room air at high speed until a changing amount of the air pollution state value detected by said gas sensor becomes a first standard value;

a step for rotating said ventilating fan at middle speed so as to ventilate the room air until the changing amount of said air pollution state value falls below a second standard valur;

a step for rotating said ventilating fan at low speed so as to ventilate the room air until the changing amount of said air pollution state value falls below a third standard value; and a step for setting said air pollution state value to the air cleanness standard value at a time when the changing amount of said air pollution state value falls below the third standard value.

16. A method as defined in claim 15, wherein said changing amount of said air pollution state value at the high speed ventilating step is calculated based on said air pollution state value of one second duration sensed at every 500 ms time.

17. A method as defined in claim 16, wherein said changing amount of said air pollution state value at said middle speed and low speed ventilating steps is calculated based on said air polltion state value of eight seconds duration sensed at every 500 ms.

18. A method as defined in claim 17, wherein said room air observing process comprises:

a step for calculating an average value of air pollution state value of eight seconds duration sensed at every 500 ms; and a step for comparing said average air pollution state value with the air cleanness standard value.

* * * * *